United States Patent [19]

Little

[11] 4,422,817
[45] Dec. 27, 1983

[54] LOAD MANIPULATING APPARATUS

[75] Inventor: Frank Little, Au Gres, Mich.

[73] Assignee: The Harshaw Chemical Company, Cleveland, Ohio

[21] Appl. No.: 268,622

[22] Filed: May 29, 1981

[51] Int. Cl.³ ............................................. B65G 65/23
[52] U.S. Cl. ..................................... 414/421; 414/590; 414/639; 187/19
[58] Field of Search ............... 414/420, 421, 422, 639, 414/640, 641, 662, 672, 589, 590, 735, 642; 187/17, 19, 95; 248/349; 310/232; 294/67 DA, 81 SF, 69 R; 417/223

[56] References Cited

U.S. PATENT DOCUMENTS

| | | | |
|---|---|---|---|
| 2,317,135 | 4/1943 | Crittenden et al. | 417/223 |
| 3,137,402 | 6/1964 | Gunn, Jr. | 414/421 |
| 3,221,908 | 12/1965 | Larson | 414/735 |
| 3,261,637 | 7/1966 | Bopp et al. | 294/81 SF |
| 3,306,479 | 2/1967 | Hopfeld | 414/421 |
| 3,522,893 | 8/1970 | Yokich | 414/420 |
| 3,850,473 | 11/1974 | Huber | 414/685 |
| 3,866,717 | 2/1975 | Johansson | 187/19 |
| 3,899,205 | 8/1975 | Lanigan et al. | 294/81 SF |
| 4,066,178 | 1/1978 | Carson | 414/420 |
| 4,312,622 | 1/1982 | Favareto | 414/735 |
| 4,348,731 | 9/1982 | Kogawa | 414/735 |

FOREIGN PATENT DOCUMENTS 474904 10/1952 Italy ..................................... 248/349

Primary Examiner—Robert B. Reeves
Assistant Examiner—Donald Hajec
Attorney, Agent, or Firm—Watts, Hoffmann, Fisher & Heinke Co.

[57] ABSTRACT

A load manipulating apparatus including a turnstile 10 supported for rotation about a fixed stub shaft 30 defining a substantially vertical axis, an elevating mechanism 12 supported for vertical reciprocating motion by the turnstile, and a rotatable operating arm 14 carried by the elevating mechanism including a mechanism 205 for releasably engaging a load receiving container 18. Support columns 22 defining a path of motion for the elevating mechanism include integral fluid reservoirs that form part of a fluid pressure operating system for effecting movements in the turnstile, elevator, operating arm, and container engaging mechanism. The turnstile mounts a source of pressurized fluid 230 that communicates with a source of power through a slip ring assembly 232, enabling the turnstile to rotate through an arc of greater than 360 degrees in either direction and includes a drive motor 54 coupled to a gear 52 mounted to the stub shaft which upon actuation orbits the gear thereby effecting vertical rotation of the turnstile. The elevating mechanism includes a fluid driven motor that is coupled to gear racks mounted longitudinally along the column members.

12 Claims, 7 Drawing Figures

LOAD MANIPULATING APPARATUS

TECHNICAL FIELD

The present invention relates generally to material handling apparatus and in particular to a load manipulating machine for transferring material and/or load containers between vertically and/or laterally spaced positions.

BACKGROUND ART

The individual processing steps of conventional metal finishing processes are often performed at separate work stations, each station usually including a specialized piece of equipment. For example, in batch plating processes, parts to be plated are brought to a loading station where the parts are loaded into a metal finishing container often called a "barrel". After loading, the barrel is engaged by a conveyor system such as a return barrel machine or programmed hoist which carries the loaded barrel through the "wet" steps of the plating process. At the conclusion of this portion of the process, the parts are unloaded from the barrel and transferred to a drying station which may include a centrifugal dryer to provide the requisite drying. At the conclusion of this drying step, parts are usually transferred to a shipping station from where the finished parts are forwarded to the customer.

In general, the parts are transferred between the processing stations by conveyors or by means of special transfer containers such as wire mesh or perforate sheet metal baskets which are typically attached to and transported by an overhead hoist system. In the latter transfer method, operators are needed to load and unload the parts baskets, one or more times during the process.

It is desirable to automate as much of the metal finishing process as possible to not only reduce labor cost, but also to minimize personnel exposure to the processing chemistry. Additionally, the production rate and efficieny of a metal process can often be a function of a skill and motivation of the operators. Oftentimes, the productivity is reduced by interruptions such as coffee breaks, sickness, lunches, shift changes and operator fatigue.

In all but the most advanced metal finishing plants, the parts to be processed are manually loaded into the metal finishing barrel at the commencement of the process, and then are manually unloaded from the barrel into other machines such as dryers at the conclusion of the process. The transfer of parts between the various stations is not only fatiguing to an operator but exposes the equipment to potential damage by a careless operator.

In the more advanced metal finishing plants, attempts at automating the parts transferred between the stations have been made. Typically, belt conveyors, skip loaders, etc. are used to facilitate the transfer, but nevertheless, some operator effort is still needed even in the most advanced processes. Additionally, the use of multiple conveyors for transferring the parts from the plurality of machines which typically form the total metal finishing process, can be costly to purchase and maintain.

DISCLOSURE OF THE INVENTION

The present invention provides a new and improved load manipulating machine that is operative to transfer load containers and/or parts between vertically and/or laterally displaced positions and which is especially suited for transferring parts between the various stations of a metal finishing process. In the preferred embodiment, the apparatus disclosed by the present invention is fully automated and requires little, if any, operator interaction during operation other than monitoring.

According to the preferred embodiment, the invention comprises a rotatable assembly, which for purposes of clarity shall be characterized as a turnstile, that is supported for rotation about a subtantially vertical axis. The turnstile is rotatable between at least two, but preferably a plurality of positions which correspond to locations of various metal finishing stations or processing machines.

The load manipulating machine includes an operating arm that includes structure for receiving and discharging parts in process. According to the preferred construction, the arm is rotatably mounted to an elevating mechanism that forms part of the turnstile, which is reciprocally movable along a path substantially parallel to the rotational axis of the turnstile. According to this prefered embodiment, the operating arm itself is rotatable about a substantially horizontal axis which is preferably orthogonal to the rotational axis of the turnstile.

The disclosed load manipulating and transferring apparatus greatly automates the overall metal finishing process thereby increasing productivity and thruput. The mutually orthogonal planes of motion provided by the turnstile and elevating mechanism, allow the operating arm to be located at virtually an infinite number of positions to accommodate a variety of work stations and tasks. Moreover, movements in the arm can be precisely controlled and repeated with great accuracy thereby insuring continuous, uninterrupted operation of the metal finishing process.

In the preferred embodiment, the structure for receiving parts comprises a detachable load container, releasably engaged by the operating arm. According to this feature, the load container is engaged by rotating the turnstile and energizing the elevating mechanism to position the operating arm in predetermined alignment with the container. A container-engaging mechanism, forming part of the operating arm is extended to engage the container so that the container will be raised or lowered upon movement in the elevating mechanism and transferred laterally upon rotation of the turnstile.

With this preferred construction, the operating arm is provided with added flexibility for it allows the arm to transfer empty or loaded containers from one location to another, or alternately, to discharge the contents of a container into another parts receiving receptacle or machine, by rotating about its horizontal axis.

According to the preferred and illustrated embodiment, the turnstile is supported for rotation by a turnplate assembly that rotates about a vertically extending, fixed stub shaft that defines the axis of rotation for the turnstile and locates the base of the turnstile. The elevator mechanism for raising and lowering the operating arm is guided for vertical, reciprocating motion by a pair of column members that are attached to and extend vertically from the top of the turn plate assembly. Actuation of a driving arrangement raises and lowers the elevator with respect to the columns. Rotation of the turnstile is preferably achieved by a drive motor, mounted on the turnstile which drivingly engages the stub shaft preferably through a gear fixed to the top of the shaft.

In the preferred construction, the turnsile can be rotated through an arc of greater than 360° in either direction. To accomplish this feature, a conventional slip ring assembly is utilized to convey external power to the turnstile. In order to take full advantage of this feature and to minimize cost and complexity, at least some, but preferably all the actuators for effecting movement in the turnstile, elevator, and operating arm are fluid pressure operated. A source of pressurized fluid, namely an electrically driven fluid pump and suitable control system are mounted on the turnstile; the power for the pump motor is transmitted through the slip ring assembly.

This preferred construction enables the turnstile to completely rotated about its axis in either direction thus allowing the operating arm to be located at any position along the arc of rotation. Moreover, the construction eliminates the need for the turnstile to be counter rotated to an initial start position at the commencement of each sequence. In the preferred embodiment, the turnstile is a self-contained assembly in that all actuators for effecting movement in the various mechanisms are mounted to and form part of the turnstile eliminating the need for externally mounted power sources and complex linkage arrangements.

According to another feature of the invention, the columns which guide the elevator mechanism also serve as fluid reservoirs for the fluid pressure operating system. In accordance with this feature, each column comprises an elongate upright defining an enclosed internal volume. Ports formed at or near the bottom of each column are connected to fluid supply and fluid return conduits. Internal baffling separates the ports to minimize turbulence-induced aeration.

According to further aspects of this feature, each column is preferably a weldment, rectangular in cross section and fabricated from steel plate. The exterior of each column includes guide surfaces engaged by guide members, preferably rollers, mounted to the elevator. In addition, a gear rack extends longitudinally along each column is engaged by a drive motor and associated gearing mounted on the elevator. As noted above, the drive motor is preferably fluid pressure operated and in turn, drives a gear arrangement that is coupled to the column mounted gear racks. Actuation of the fluid motor raises and lowers the elevator with respect to the columns depending on the direction of rotation. In accordance with this preferred construction, the operating arm and load container-engaging mechanism are each actuated by a double-acting, fluid pressure operated cylinder.

Additional features and a fuller understanding of the present invention will be obtained in reading the following detailed description made in connection with the accompanying drawings.

BEST MODE FOR CARRYING OUT THE INVENTION

Figure 1:
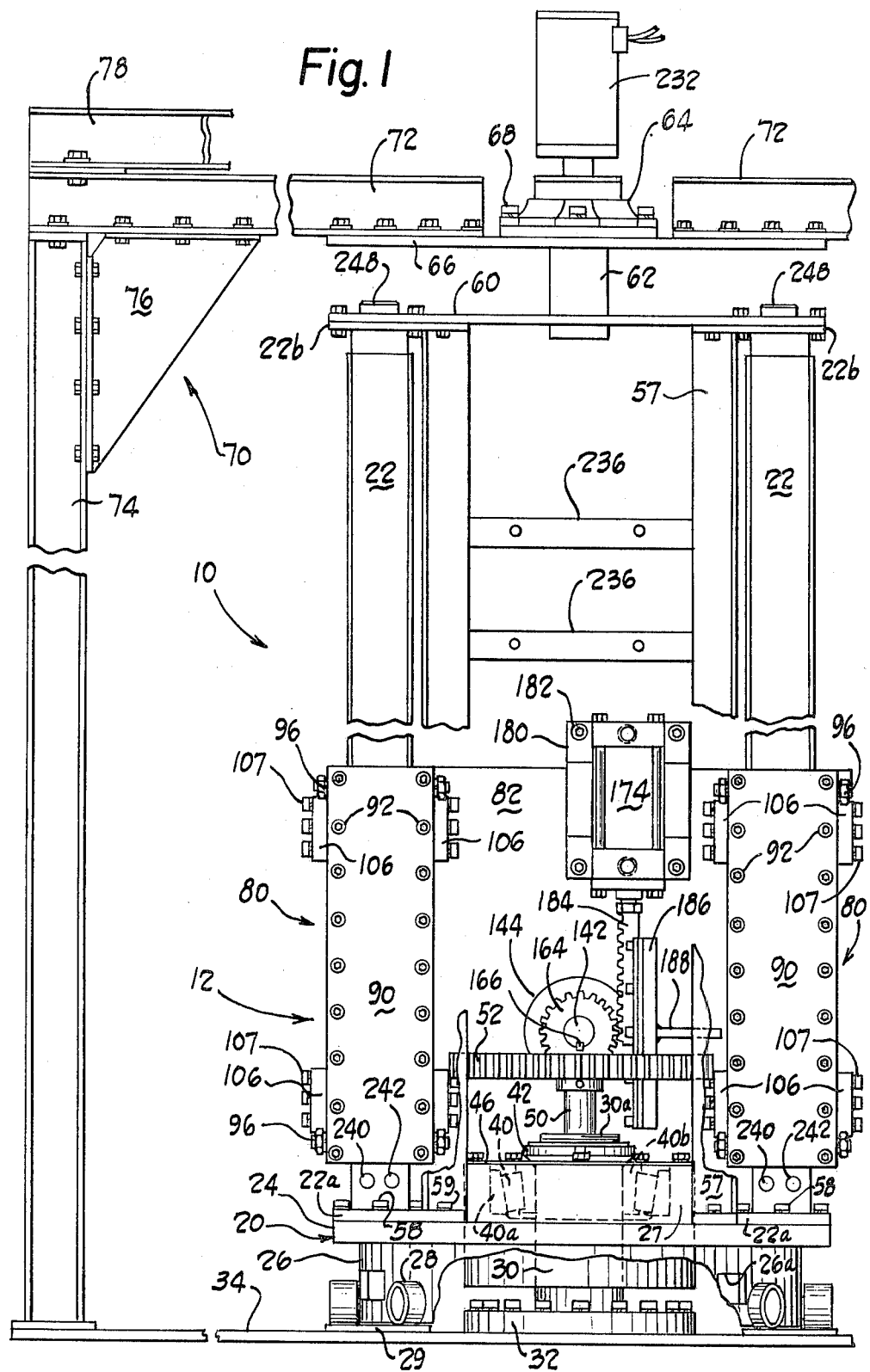
FIG. 1 is a rear elevational view of a load manipulating apparatus constructed in accordance with a preferred embodiment of the invention, with portions broken away and certain parts omitted for clarity.

FIG. 1 illustrates a load manipulating apparatus constructed in accordance with the preferred embodiment of the invention. The apparatus is rotatable about a substantially vertical axis and is operative to transfer loads and/or load containers between laterally and/or vertically spaced positions.

Figure 2:
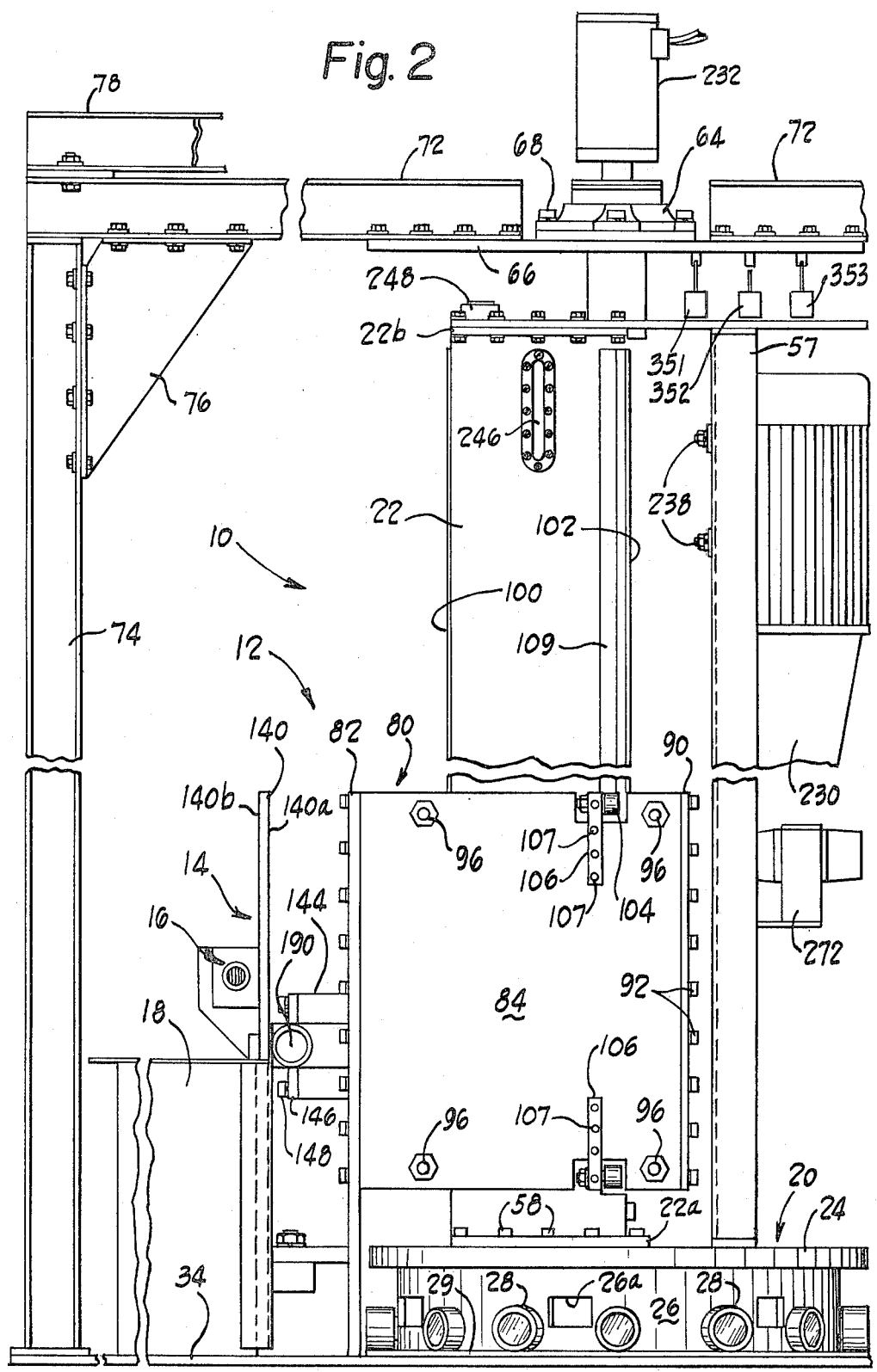
FIG. 2 is a side elevational view of the apparatus shown in FIG. 1.

Referring also to FIG. 2, the preferred apparatus comprises a rotatable assembly which for purposes of explanation will be termed a turnstile, indicated generally by the reference character 10. An elevating mechanism, indicated generally by reference character 12 is supported for vertical, reciprocating movement by the turnstile. The elevator, in turn, carries an operating arm 14 which in the preferred embodiment is rotatable about a horizontal axis and includes a mechanism 16 for releasably engaging a load container 18.

The turnstile 10 comprises a turnplate assembly 20 and a pair of vertically extending support columns 22. The turnplate assembly 20 comprises a horizontally disposed circular turnplate 24 fastened to a roller mounting ring 26. A centrally mounted bearing housing 27 (shown best in FIG. 4) extends upwardly from the turnplate 24. The ring 26 mounts a plurality of caster-like rollers 28 that are spaced about its circumference and includes a plurality of access openings 26a. The rollers 28 ride atop a thrust plate 29 that is replaceable should excessive wear occur. The rollers support the turnstile for rotation about a vertical axis defined by a fixed stub shaft 30 (shown in FIG. 1) that is welded to a mounting flange 32. The flange 32 is bolted to a base plate 34 by a plurality of fasteners 36 or alternately can be bolted directly to the floor of the work area. The turnplate assembly 20 is journaled to the stub shaft 30 by a relatively heavy, tapered roller bearing assembly 40 having an outer race 40a suitably fastened to the housing 27 and an inner race 40b clamped onto the stub shaft 30 by a locking nut 42 which threadedly engages a threaded portion 30a of the stub shaft 30. A cover plate 46 covers the bearing assembly 40 to prevent the entry of dirt, shavings, etc and is bolted to the top of the bearing housing 27.

Figure 3:
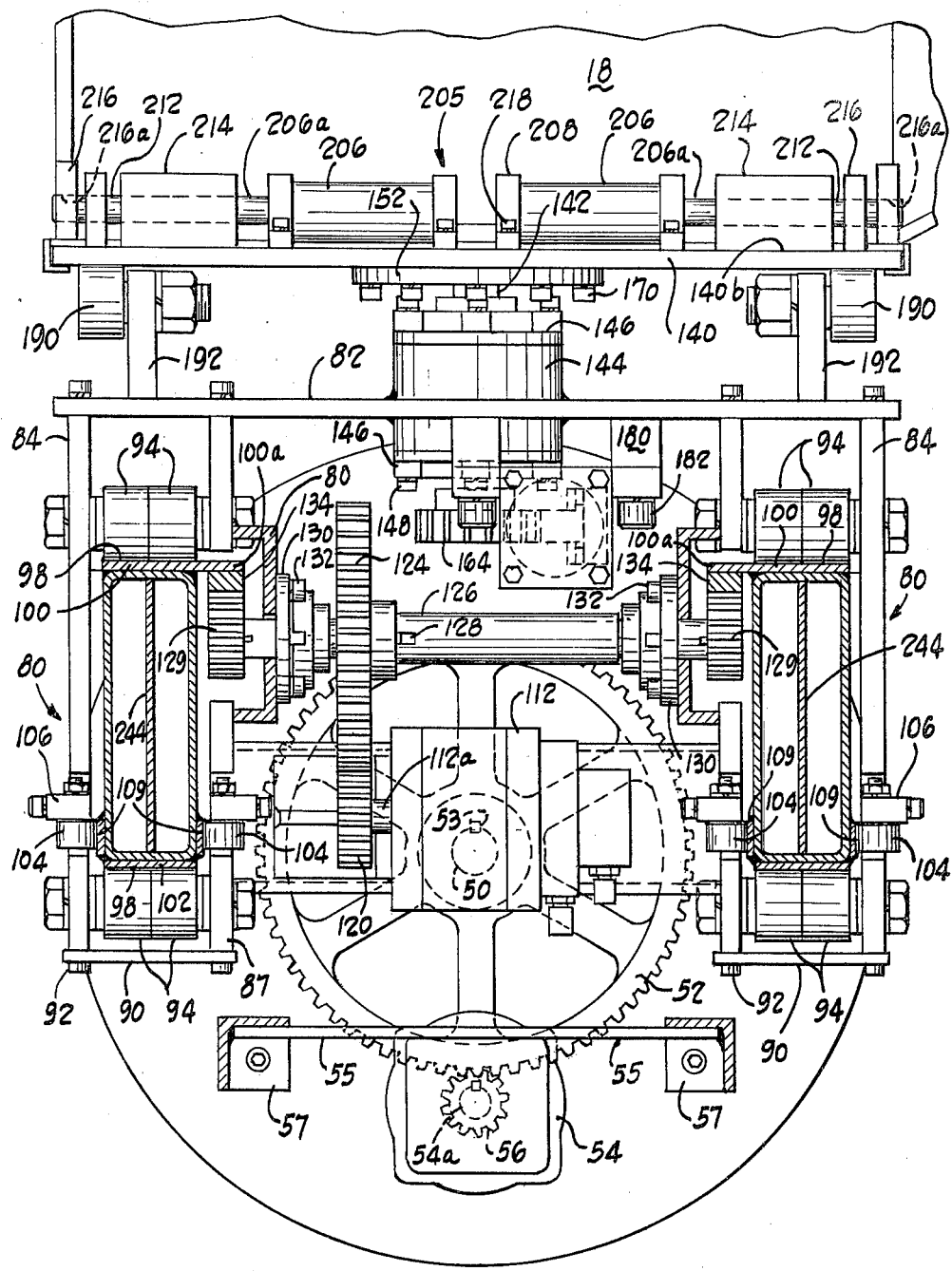
FIG. 3 is a top plan view, partially in section, of the load manipulating apparatus shown in FIG. 1.
Figure 4:
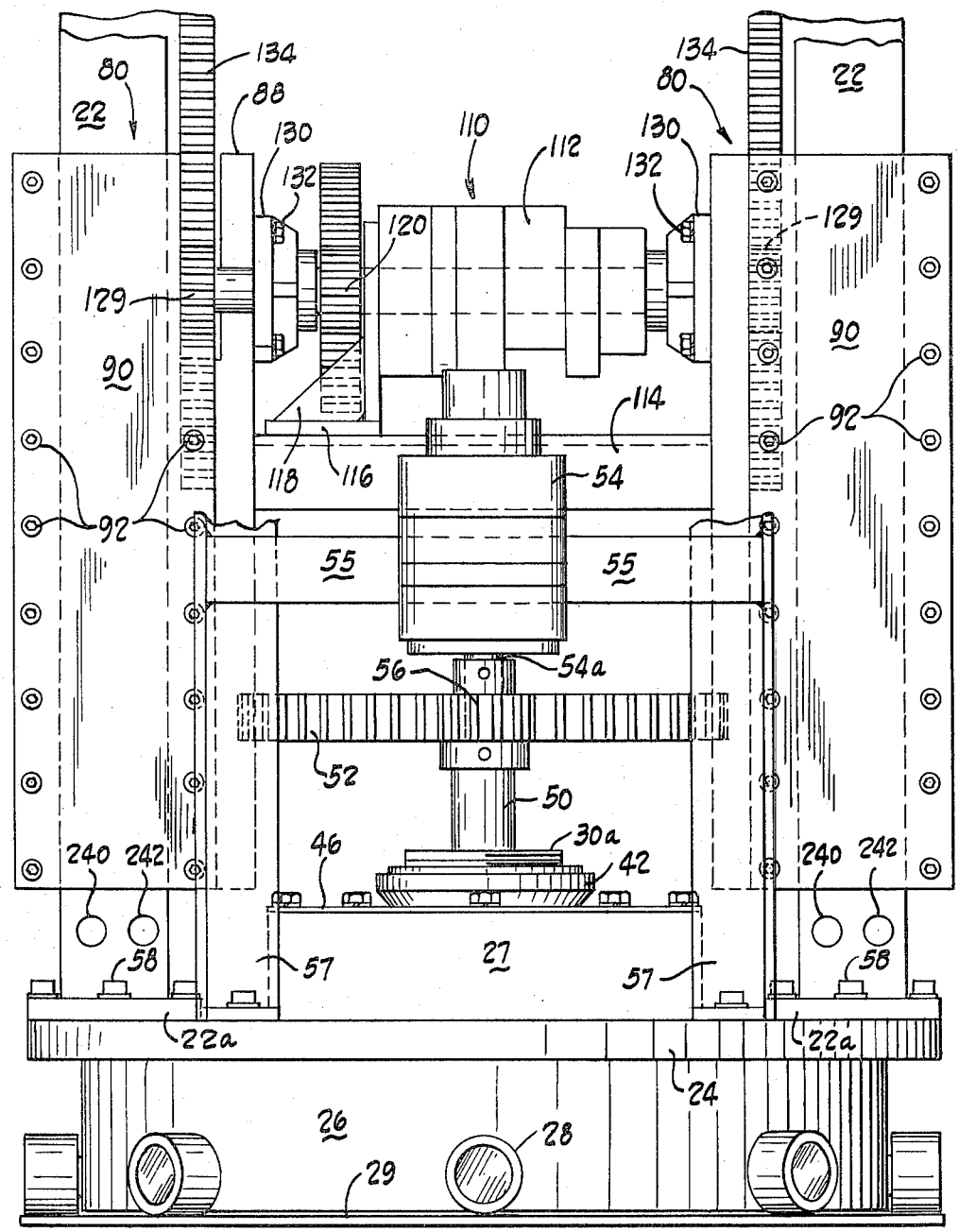
FIG. 4 is an enlarged fragmentary view of the apparatus shown in FIG. 1 with parts omitted for clarity.

Referring also to FIGS. 3 and 4, a relatively narrow shank 50 extends upwardly from the top of the stub shaft 30 and rigidly mounts a fixed gear 52 by means of a key 53. A turnstile drive motor 54 mounted to the turnplate 24 drivingly engages the fixed gear 54 through a drive gear 56 attached to the drive motor output shaft 54a. The drive motor 54 is mounted between a pair of L-shaped uprights 57 by laterally extending mounting plates 55. The L-shaped uprights extend upwardly from and, are fastened to, the turnplate 24 by cap screws 59 (see FIGS. 3 and 4). Actuation of the drive motor 54 causes the motor to orbit about the fixed gear 52 thereby effecting rotation of the entire turnstile 10 about the vertical axis defined by the stub shaft 30.

As seen in FIGS. 1, 2, and 4, the support columns 22 each include mounting flanges 22a at their lower extremes, that are bolted to the turnplate 24 by threaded fasteners 58. In the illustrated embodiment, the upper ends of the support columns 22 terminate in a flange 22b and are joined to a tie plate 60 that in turn mounts an upwardly extending shaft 62 that rotatably engages a bearing assembly 64 mounted to a bearing support plate 66 by suitable fasteners 68. The upper ends of the vertical uprights 57 are also bolted to the tie plate 60.

In the illustrated embodiment the bearing mounting plate 66 is supported above the turnstile assembly 10 by a frame structure, indicated generally by the reference character 70. Referring also to FIG. 2, the frame structure includes four vertical members 74 spaced 90° apart, each supporting an associated transverse girder 72 that is attached to the bearing mounting plate 66. Gusset plates 76 and corner cross beams 78 rigidize the overall frame structure 70. The bottom ends of the vertical support members 74 are connected to the base plate 34 upon which the turnstile assembly 10 rotates.

The disclosed frame structure 70 can be eliminated or at least reduced in size by securely anchoring the stub shaft 30 (by means of the mounting flange 2) to the floor of the work area. Securely locating the stub shaft 30 will prevent the turnstile assembly 10 from tipping during load carrying operations. In those installations in which the stub shaft is mounted directly to the floor of the work area and the frame 70 eliminated, the mounting plate 66 can be simply suspended from, or supported by structure suspended from, the plant ceiling.

In the preferred embodiment, the support columns 22 are rectangular in cross section and define a vertical path of motion for the elevator 12. Referring also to FIGS. 3 and 4, the elevator 12 includes a pair of spaced, column engaging housings 80 joined to and extending laterally from a vertically disposed primary support plate 82 (shown best in FIG. 3). Each housing 80 includes an outboard housing plate 84 and a pair of inboard housing plates 86, 87 spanned by a U-shaped girder member 88. Tie plates 90 are fastened to the outer edges of the plates 84, 87 by a plurality of fasteners 92. Each housing 70 includes four pairs of guide rollers 94 mounted at locations indicated by the reference character 96 in FIGS. 1-3. The guide rollers 94 ride against column guide surfaces 98 formed by fore and aft plate members 100, 102 (as viewed in FIG. 2) mounted to the support columns 22. The guide plates 100, 102 are preferably tack welded to the columns 22 so that they can be removed and replaced should excessive wear occur. Each housing 80 also includes four side thrust rollers 104 mounted to the outboard housing plate 84 and inboard housing plate 87, respectively, by brackets 106 and associated fasteners 107. The side thrust rollers 104 ride against the outer surfaces of longitudinal guide plates 109 welded to opposite sides of the support columns 22.

The elevator 12 is raised and lowered with respect to the support columns 22 by a driving arrangement, indicated generally by the reference character 110 in FIG. 4, that forms part of the elevator 12. Referring in particular to FIGS. 3 and 4, a drive motor 112 is mounted transversely between the elevator housings 80 on a U-shaped channel 114 that extends between the inboard housing plate members 87. In particular, the drive motor 112 is fastened to an L-shaped bracket 116 that includes a gusset 118. The bottom leg of the bracket 116 is fastened to the channel member 114. A drive gear 120 mounted to the drive motor output shaft 112a drivingly engages a gear 124 that is fixed to a jackshaft 126 by a key 128. The jackshaft 126 extends through slots formed in the girder members 88 and mounts a pair of spur gears 129 at its outer ends. The jackshaft 126 is rotatably supported by bearing assemblies 130 suitably fastened to the sides of the girder members 88 by fasteners 132. Each spur gear 129 is geared to a longitudinal rack 134 that extends along each support column 22. Referring in particular to FIG. 3, the guide plate 100 that defines the guide surface for the rollers 94 includes a portion 100a that extends beyond the side of the support column 22. In the preferred embodiment, the racks 134 are fastened to the inside face of the extending portion 100a by suitable fasteners. As seen in FIG. 4, actuation of the drive motor 112 rotates the jackshaft 126 and associated spur gears 129 thereby raising or lowering the elevator 12 with respect to the support columns 22, depending on the direction of rotation.

The rotatable operating arm 14 (see FIG. 1) is mounted to the elevator 12 and includes a tilt plate assembly that mounts an apparatus for releasably engaging a load carrying receptacle 18. The operating arm 14 is operative to engage, position, and rotate a load container through a predetermined arc to discharge its contents. Referring to FIGS. 2 and 3, the tilt assembly comprises a vertically disposed tilt plate 140 that is attached to a horizontally disposed shaft 142 (see also FIG. 1) that is rotatably supported by the elevator support plate 82. In particular, a bearing hub 144 extends through and is welded to the primary support plate 82. A pair of flanged cartridge bearings 146 is mounted at opposite ends of the bearing hub 144 by a plurality of fasteners 148. The shaft 142 (which forms part of the operating arm 14) is rotatably supported by the bearings 146. A flange 152 is fastened to one end of the shaft 142 and a spur gear 164 is keyed to the opposite end (shown in FIGS. 1 and 3) by a key 166 (shown only in FIG. 1). The flange 152 is bolted to the rear side 140a of the vertically standing tilt plate 140 by a plurality of threaded fasteners 170. Rotation of the shaft 142 will thus rotate the tilt plate 140.

Referring in particular to FIG. 1, the shaft 142 is rotated through a predetermined arc by an actuator, preferably a double-acting hydraulic cylinder 174 that is mounted to the elevator primary support plate 82 by means of brackets 180 and threaded fasteners 182. As seen in FIG. 1, a rack 184 operatively attached to the cylinder 174, extends downwardly and engages the spur gear 164. A rack guide 186 preferably including a trackway 186a having brass bearing surfaces, guides the rack 184 for vertical reciprocating motion and maintains the engagement between the spur gear 164 and the rack. The guide 186 is mounted in the position shown in FIG. 1 by welding it directly to the back of the primary elevator support plate 82. A gussett 188 reinforces the mounting of the rack guide. It should be recognized that downward movement of the rack 184 produces clockwise rotation in the shaft (as viewed in FIG. 1) whereas upward movement produces counterclockwise rotation.

The tilt plate is guided for rotation in a vertical plane by a plurality of thrust rollers 190 (shown in FIGS. 2 and 3) that ride against the rear surface 140a of the tilt plate 140. The rollers are mounted to stand-offs 192 that are welded to the elevator primary support plate 82. The rollers 190 insure that the tilt plate remains in a vertical plane when rotating a loaded container 18.

Figure 6:
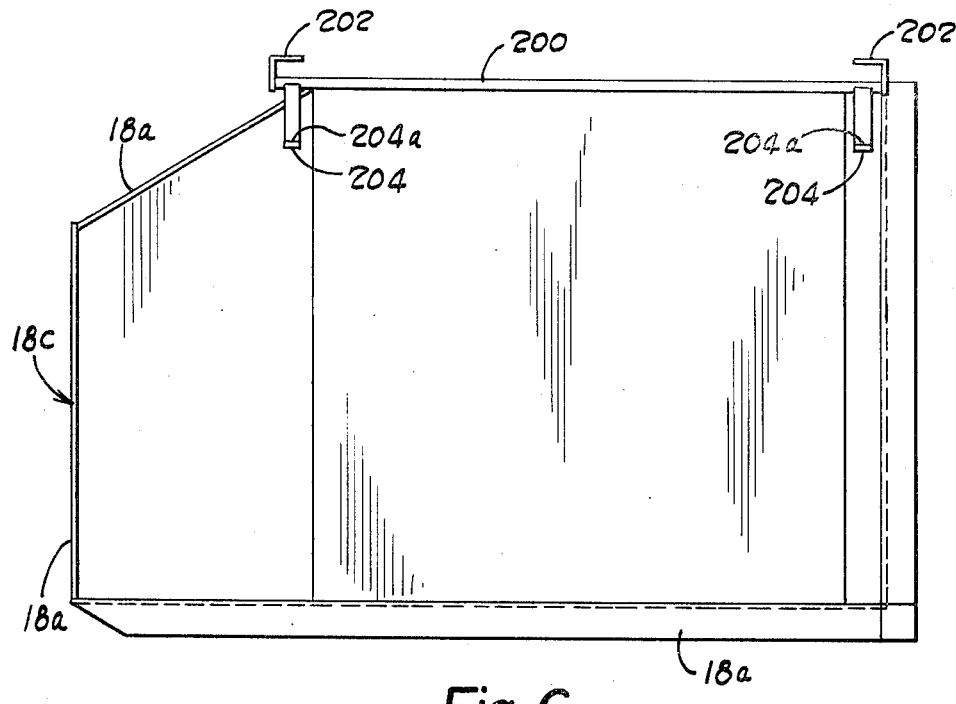
FIG 6 is a plan view of the container illustrated in FIG. 5.
Figure 5:
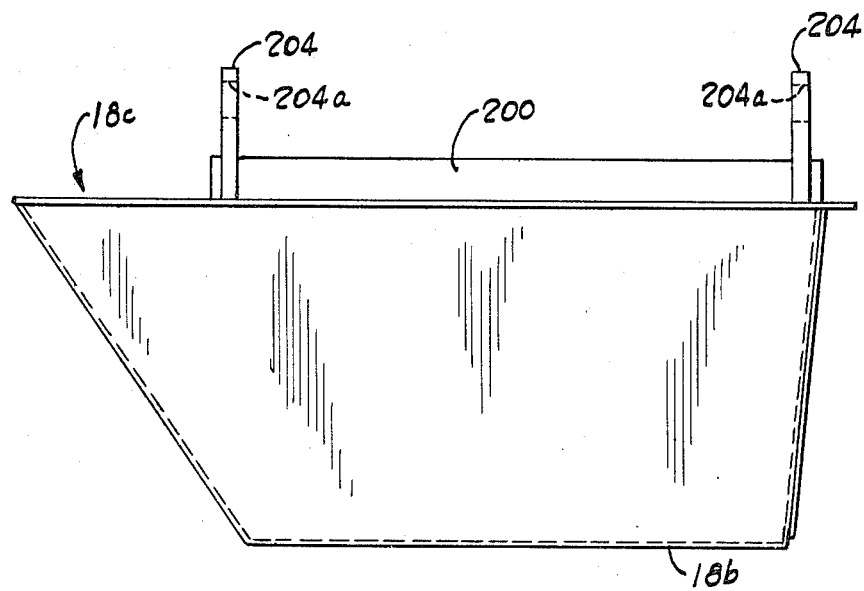
FIG. 5 is a side elevational view of a load container constructed in accordance with the preferred embodiment.

As seen in FIGS. 2 and 3, the tilt plate 140 mounts a mechanism for releasably engaging the load container 18. An example of a load container 18 is illustrated in FIGS. 5 and 6. In the illustrated embodiment, the container comprises an open top, volume-defining structure having a plurality of sides 18a and a bottom plate member 18b preferably constructed of a rigid material such as heavy gauge steel and includes a scoop-like portion 18c from which its contents are discharged when it is engaged and rotated by the tilt plate 140. The container is fitted with structure engageable by the tilt plate mechanism. In particular, a plate 200 is fastened to one side of the load carrying receptacle (as by welding). A pair of L-shaped brackets 202 are suitably fastened to opposite edges of the vertical plate 200 and define a track engageably by the tilt plate 140. A pair of spaced ears 204 having apertures 204a are welded in the upper portion of the vertical plate 200.

The tilt plate 140 mounts a container engaging mechanism 205 that is operative to engage the apertured ears 204 forming part of the load container 18. In the preferred embodiment, a pair of double-acting actuators 206 are mounted to the front face 140b of the tilt plate 140 by brackets 208 and threaded fasteners 210. Each actuator 206, includes a slidably, laterally extending pin 212 forming part of the piston rod 206a of each cylinder 206. The piston rods 206a are slidably supported by a slide block 214 associated with each cylinder and are movable towards and away from a locking plate 216 mounted a spaced distance from the outer end of each slide block 214. Each locking plate 216 includes a through aperture 216a located in coaxial alignment with its associated pin 212.

Returning to FIGS. 2 and 3, to engage the container or receptacle 18, the elevator 12 is first raised so that the bottom edge of the tilt plate 140 is above the upper edges of the L-shaped brackets 202. The container and/or tilt plate assembly 18 are then positioned in vertical alignment. The elevator 12 is then lowered so that the tilt plate decends between the L-shaped brackets 202 and the vertical mounting plate 200 (as seen in FIG. 3). To facilitate engagement, the lower portion of the tilt plate is preferably tapered so that the bottom edge of the tilt plate will descend between the brackets 202, even if slightly misaligned and will thus move the container into alignment as the elevator descends. The elevator 12 is lowered until the apertures 204a in the ears 204 are aligned with locking plate apertures 216a and pins 212.

The cylinders 206 are then actuated to drive the pins 212 outwardly, through the apertures 204a in the ears 204 and engage the apertures 216a formed in the lock plates 216 (as seen in FIG. 3). With the pins 212 in the position illustrated, the load carrying receptacle 18 is held by the tilt plate 140 and can be raised and lowered and/or tilted by the elevator 12. Retracting the locking pins 212, releases the receptacle 18, complete disengagement being achieved by raising the elevator 12 until the tilt plate 140 clears the L-shaped brackets 202.

Although various driving arrangements and drive sources for effecting movement in the elevator 12, turnstile 10, tiltplate 140 and container engaging mechanism 205 are contemplated by the present invention, in the preferred embodiment all movements are provided by fluid pressure operated actuators and motors. In the preferred construction, a source of fluid pressure preferably an electrically driven fluid pump 230 forms part of the turnstile 10 and a control system mounted to the turnstile controls the communication of fluid pressure to the various actuators and motors. According to this embodiment, a slip ring assembly 232 is rotatably connected to the turnstile 10 and communicates a source of electrical power to the fluid pump 230 and the turnstile control system. In particular, a pair of lateral cross bars 236 are welded between the L-shaped uprights 57 (shown in FIG. 1) and serve as a mounting for the fluid pump 230. As seen in FIG. 2 the pump 230 is bolted to the cross bars 236 by fasteners 238. According to this preferred construction both the turnstile and the elevator actuators 54, 112, respectively, are fluid motors.

According to a feature of the invention, each support column 22 serves as a fluid reservoir for the fluid pressure operating system. Each column member includes an input and output port 240, 242 located near the base of each member 22 (shown best in FIG. 1) and an internal baffle 244 (shown in FIG. 3) for separating the fluid near the bottom of the reservoir to prevent turbulence-induced aeration. As seen in FIG. 2 at least one column member includes a sight glass 246 for determining the level of fluid in both reservoirs and a combination breather and filler cap 248 mounted at the top of each column 22.

Figure 7:
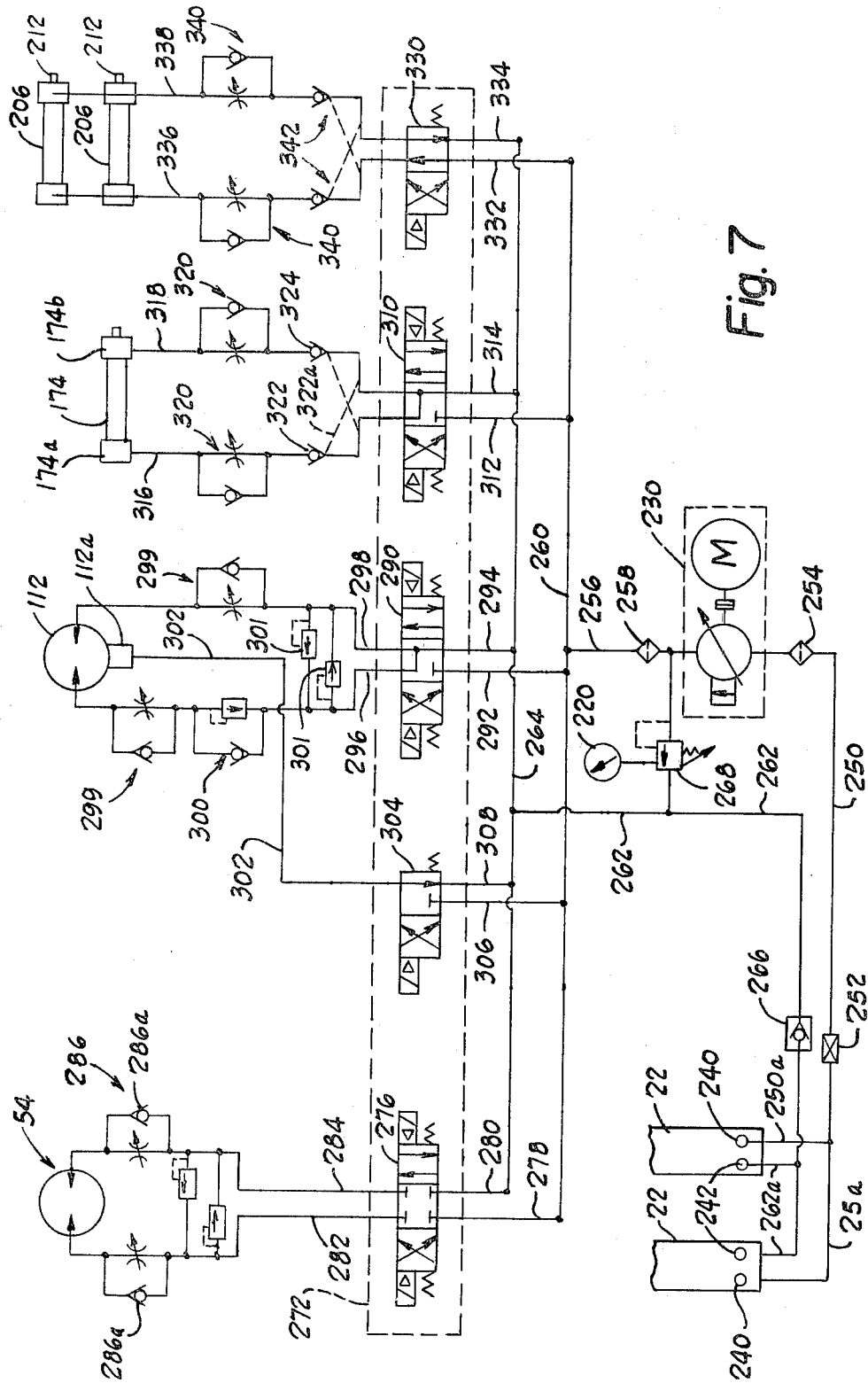
FIG. 7 schematically illustrates a fluid pressure control system for the load manipulating apparatus.

FIG. 7 schematically illustrates a fluid pressure operating system for controlling the actuation of the turnstile and elevator fluid motors 54, 112 and the fluid pressure operating actuators 174, 206. A conduit 250, including branches 250a connected to the ports 240 of the column members 22, communicates fluid from the integral reservoirs to the intake of the fluid pump 230. The conduit 250 includes a manual shutoff valve 252 and an inline filter 254. A conduit 256 including a filter 258 communicates the output of the fluid pump 230 with a supply manifold 260. A return conduit 262 connected to a fluid return manifold 264 communicates fluid discharged by the motors and actuators to the integral fluid reservoirs 22 through a check valve 266 which prevents reverse flow. The conduit 262 includes branch conduits 262a connected to the ports 242 located at the base of each column member 22. A pressure relief valve 268 and pressure gauge 270 are disposed in a branch line 258a. The pressure relief valve 268 is operative to dump the output pressure of the fluid pump directly into the return line 262 should the pressure exceed a predetermined level.

The communication of fluid pressure from the fluid pump 230 to the various fluid motors and actuators is controlled by solenoid operated control valves preferably located on a control panel 272, indicated schematically in FIG. 7 and shown partially in FIG. 2. The communication of pressurized fluid to the turnstile motor 54 is controlled by a three-position, dual solenoid valve 276. A supply line 278 connects the valve with the supply manifold 260 and a return line 280 connects the valve with the return manifold 264. The control valve 276 selectively communicates the supply line 278 with one of two actuator supply conduits 282, 284 and thus determines the rotational direction of the turnstile motor 54. As viewed in FIG. 7, when the valve 276 is shifted to the left, the supply line 278 communicates with the actuator conduit 282. When shifted to the right, the supply line 278 communicates with the actuator supply conduit 284. It will be recognized, that when one of the two actuator supply conduits 282, 284 is receiving pressure, the other of the conduits is communicated with the return line 280 which conveys the fluid discharged by the motor 54 to the reservoirs 22.

The rotational direction of the turnstile motor 54 is selected by communicating pressure to one of the two conduits 282, 284. Each conduit path includes a conventional pressure compensated flow control 286 that determines the actuation rate, i.e. rotational speed, of the fluid motor 54. The check valves 286a forming part of the flow control 286 allow unimpeded return flow. Commercially available crossing modules 288 are disposed between the conduits 282, 284 and act to dampen fluid forces when the solenoid valve 276 is shifted to its neutral position (shown in FIG. 7) and allow fluid to cross between the actuator conduits 282, 284 should an excessive external load be encountered.

A somewhat similar fluid control arrangement is provided for controlling the direction of rotation for the elevator motor 112. An additional fluid circuit for controlling a mechanical brake 112a forming part of the elevator motor 112 is also provided. A three-position, dual solenoid control valve 290 determines the direction of rotation of the motor 112. Supply and return conduits 292, 294 connect the valve 290 with the supply and return manifolds 260, 264, respectively. The valve 290 controls the fluid communication of the conduits 292, 294 with a pair of actuator conduits 296, 298. When the valve 290 is shifted to the right (as viewed in FIG. 7), pressurized fluid is communicated to the conduit 298 and the conduit 296 acts as a return. When the valve is shifted to the left, the conduit 296 receives pressure and the conduit 298 acts as a return. When the valve 290 is in neutral position (shown in FIG. 7), supply pressure is blocked, and both conduits 296 and 298 are connected to the return conduit 294. Each actuator supply conduit 296, 298 includes a pressure compensated flow control module 299 which determine the actuation rate (rotational speed) of the elevator motor 112. The conduit 296 additionally includes a fluid counter balance module 300 which prevents "motor overrun" when the elevator 12 is being lowered. Crossing modules 301 are disposed across the actuator conduits 296, 298 and act to dampen fluid forces or relieve pressure in event of an excessive external load.

The elevator motor 112 also includes a mechanical brake to mechanically lock the motor to prevent load induced movement, in the absence of fluid pressure. The brake 112a (indicated schematically in FIG. 7) is released by the application of fluid pressure through a brake supply conduit 302. The communication of fluid pressure to the conduit 302 is controlled by a two position solenoid operated valve 304 which is connected to the supply and return manifolds 260, 264 through supply and return conduits 306, 308. When the solenoid valve 304 is in the position shown in FIG. 7, the brake supply conduit 302 is connected to the return manifold and supply pressure is blocked. Energizing the valve 304, communicates fluid pressure to the brake 112 affecting its release. In order to effect movement in the elevator motor 112, both the solenoid valve 304 and the solenoid valve 290 must be energized. The valve 304 releases the brake whereas the control valve 290 determines the direction of rotation.

Movement in the tilt actuator 174 is controlled by a three-position solenoid valve 310 which is connected to the supply and return manifolds 260, 264 through conduits 312, 314. Pressurized fluid is connected to the head end 174a of the actuator 174 through a supply conduit 316. Pressure is communicated to the rod end 174b by a conduit 318. Each conduit 316, 318 includes a pressure compensated flow control 320 for controlling the rate of actuation. Additionally, each conduit includes a pilot operated check valve 322, 324 which is operative to allow return flow from the actuator only upon pressurization of the opposite supply line. For example, if the valve 310 is shifted to the left (as viewed in FIG. 7) supply pressure is communicated to the supply conduit 318. This supply pressure is communicated to the pilot operated check valve 322 through pilot line 322a and is operative to open the check valve to allow return flow from the head end 174a of the cylinder 174 through the conduit 316. The check valves 322, 324 prevent return flow from the actuator 174 in the absence of pressure in one of the two supply conduits and thus hydraulically lock the actuator whenever the valve 310 is in its neutral position.

The pin actuators 206 are controlled by a two-position solenoid-operated valve 330 connected to the supply and return manifolds 260, 264 by conduits 332, 334. Fluid pressure is communicated to the head ends 206a of the cylinders 206 by a supply conduit 336 whereas fluid pressure is communicated to the rod ends 206b by a conduit 338. Each conduit 336, 338 includes a pressure compensated flow control module 340 and a pilot operated check valve 342. It should be clear that, in the arrangement shown, whenever the solenoid valve 330 is deenergized, pressurized fluid is communciated to the head ends 206a of the cylinders 206 and the pins 212 are extended. When energized, the solenoid valve 330 communicates pressurized fluid to the rod end of the cylinder thereby retracting the pins 212.

A suitable electrical system (not shown) controls the actuation of the solenoid control valves 276, 290, 304, 310 and 330 and thus controls the sequence of movement in the load manipulating apparatus. For example, the apparatus can be programmed to engage a loaded container at a first position, rotate to a second position at which the elevator is raised and the tilt plate rotated to discharge the contents of the load container and then rotated to a third position at which the container is disengaged. The apparatus then returns to its first position to repeat the cycle. Referring to FIG. 7, this sequence of motion is achieved in this example by energizing the control valve 276 to rotate the turnstile 10 to the first position. The control valves 290, 304 are then energized to rotate the elevator motor 112 to lower the elevator 12 thereby effecting engagement of the tilt plate 140 with the load container 18. The control valve 330 is then energized to extend the pins 212 of the container-engaging actuators 206 to lock the container to the tilt plate assembly. The control valve 276 is then reenergized to rotate the turnstile 10 to its second position and the control valves 290, 304 energized to raise the elevator 12. After the elevator is raised, the control valve 310 is energized to extend the tilt cylinder 174 thereby rotating the tilt plate assembly causing the load container to discharge its contents. The control valve 310 is then reverse energized to counter rotate the tilt plate and subsequently, the control valve 276 is energized to rotate the turnstile to the third position at which the elevator is lowered and the actuators 206 energized to retract the pins 212 thereby releasing the container.

To precisely control the positioning of the various elements of the load handling apparatus, position sensing means such as micro switches 351–353 (shown schematically in FIG. 2) are mounted at various locations of the apparatus and monitor movements in the elevator, turnstile, operating arm, and pin actuators. Additionally, in the preferred embodiment, the slip ring assembly 232 includes a plurality of additional contacts for transmitting condition indicating signals to the control system so that the operation of the turnstile mechanism can be integrated in the overall manufacturing process. In other words, movements in the apparatus can be initiated by signals originating from other machines, etc.

It will be recognized that the present invention provides a device for picking up and handling loads and load containers that can perform a variety of transferring tasks without requiring excessive operating space. As disclosed, the apparatus is self-contained and extremely compact and includes three axes of movement embodied in a relatively small package size and therefore the unit can be used in applications having critical space constraints. The reduction in the overall size of the apparatus is further enhanced by the integration of the fluid reservoirs into the support columns 22.

An important feature of the invention lies in its ability to transfer loads between various work locations and more importantly, its ability to transfer and substitute load containers at a given location. For example, a container containing oil ladened parts to be washed, is engaged by the operating arm 14 and transferred to a washing station at which the operating arm is rotated to discharge the contents of the container into the washing device. Once empty, the turnstile 10 is rotated to a container discharge station, where the dirty container is released. The turnstile is then actuated to pick up a clean container and position it at the washing station where it receives parts at the conclusion of the cleaning process. In this way, the parts are not recontaminated by a soiled container nor does it require the manual substitution of the containers by an operator or by a specialized machine.

Although the invention has been described in connection with a metal finishing process, the apparatus itself is adaptable to a wide variety of industrial metal finishing and metal working processes. The apparatus will be found to be useful in any process that requires the transfer of material from spaced locations or the transfer of empty and/or loaded material receiving containers.

Although the invention has been described with a certain degree of particularity, it should be understood that various changes can be made to it by those skilled in the art without departing from the spirit or scope of the invention as hereinafter claimed.

I claim:

1. A load manipulating apparatus comprising:
   (a) a turnplate assembly rollingly engaging a base means and supported for rotation about an upstanding shaft by a bearing means;
   (b) a pair of columns attached to and extending upwardly from said turnplate assembly;
   (c) turnplate drive means carried by said turnplate assembly, engaging said shaft for effecting rotation of said turnplate assembly, said turnplate drive means rotating with said turnplate assembly;
   (d) an elevator guided for vertical, reciprocating movement along said columns;
   (e) elevator drive means coactable with drive structure formed on said columns for effecting movement in said elevator;
   (f) an operating arm attached to said elevator for engaging a load, including means for releasably engaging a parts receptacle, said parts receptacle comprising a hopper including a pair of spaced, apertured ears engageable by fluid pressure actuated pins carried by said operating arm; and,
   (g) arm tilt means for pivoting said arm about a horizontal axis.

2. A load manipulating apparatus comprising:
   (a) a turnplate assembly rollingly engaging a base means and supporting for rotation about an upstanding shaft by a bearing means;
   (b) a pair of columns attached to and extending upwardly from said turnplate assembly;
   (c) turnplate drive means carried by said turnplate assembly, engaging said shaft for effecting rotation of said turnplate assembly, said turnplate drive means rotating with said turnplate assembly;
   (d) said turnplate assembly and columns forming part of a rotatable turnstile that also mounts a source of pressurized fluid, said source comprising an electrically driven fluid pump and said turnstile further includes a slip ring assembly for electrically communicating said fluid pump with an external source of electric power;
   (e) an elevator guided for vertical, reciprocating movement along said columns;
   (f) elevator drive means coactable with drive structure formed on said columns for effecting movement in said elevator;
   (g) an operating arm attached to said elevator for engaging a load; and,
   (h) arm tilt means for pivoting said arm about a horizontal axis.

3. The apparatus of claim 2 wherein portions of said apparatus are fluid pressure operated and at least one of said columns defines a fluid reservoir.

4. The apparatus of claim 2 wherein said drive structure formed on said columns comprises longitudinal gear racks extending along each column and said elevator drive means comprises a drive motor carried by said elevator, geared to said drive racks.

5. The apparatus of claim 2 wherein said operating arm is connected to a shaft including a gear that is rotated through a predetermined arc by a fluid pressure operated rack.

6. The apparatus of claim 2 further comprising position sensing means for monitoring the position of said assembly.

7. The apparatus of claim 2 wherein said operating arm includes means for releasably engaging a parts receptacle.

8. The apparatus of claim 2 wherein said turnplate drive means comprises a drive motor mounted to said turnplate assembly that drivingly engages a fixed gear mounted to said shaft, such that actuation of said drive motor causes said drive motor to orbit about said fixed gear thereby effecting rotation of said turnplate assembly.

9. The apparatus of claim 8 wherein said drive motor is actuatable to produce rotation in said turnplate assembly greater than 360°.

10. The apparatus of claim 2 wherein said turnplate drive means, said arm tilt means, and said elevator drive means each comprise separate fluid pressure operated motors.

11. The apparatus of claim 2 wherein said base means is replaceable.

12. The apparatus of claim 2 wherein said base means is rollingly engaged by a plurality of rollers spaced about the circumference of said turnplate assembly.

* * * * *